United States Patent [19]

Dean

[11] Patent Number: 4,783,505

[45] Date of Patent: Nov. 8, 1988

[54] METHYLMETHACRYLATE/PHENYL-MALEIMIDE COPOLYMER AND STYRENE/MALEIC ANHYDRIDE COPOLYMER CONTAINING POLYMER ALLOYS

[75] Inventor: Barry D. Dean, Springfield, Pa.

[73] Assignee: ARCO Chemical Company, Newtown Square, Pa.

[21] Appl. No.: 930,619

[22] Filed: Nov. 14, 1986

Related U.S. Application Data

[62] Division of Ser. No. 718,594, Apr. 1, 1985, Pat. No. 4,663,390, which is a division of Ser. No. 538,243, Oct. 3, 1983, Pat. No. 4,514,543.

[51] Int. Cl.$^4$ .................. C08L 37/00; C08L 39/04; C08L 51/00

[52] U.S. Cl. ........................... 525/73; 525/74; 525/75; 525/80

[58] Field of Search .......................... 525/73

[56] References Cited

U.S. PATENT DOCUMENTS 4,451,617 5/1984 Khac .................... 525/73
4,504,627 3/1985 Dean .................... 525/73

Primary Examiner—Jacob Ziegler
Attorney, Agent, or Firm—Dennis M. Kozak

[57] ABSTRACT

Polymer alloys containing copolymers of methylmethacrylate/N-phenylmaleimide are disclosed. In one embodiment the polymer alloy is an alloy of methylmethacrylate/N-phenylmaleimide and styrene/maleic anhydride. In another embodiment, the polymer alloy is an alloy of methylmethacrylate/N-phenylmaleimide and styrene/maleic anhydride/N-phenylmaleimide.

1 Claim, No Drawings

METHYLMETHACRYLATE/PHENYLMALEIMIDE COPOLYMER AND STYRENE/MALEIC ANHYDRIDE COPOLYMER CONTAINING POLYMER ALLOYS

This is a division of application Ser. No. 718,594, filed Apr. 1, 1985 now U.S. Pat. No. 4,663,390, which a division of application Ser. No. 538,243, filed Oct. 3, 1983 which is now U.S. Pat. No. 4,514,543, issued Apr. 30, 1985.

This invention relates to polymer compositions.

More specifically, this invention pertains to the discovery of polymers which are fully compatible with one another.

In one of its more specific aspects this invention pertains to polymer alloys comprising copolymers of methylmethacrylate/N-phenylmaleimide and styrene/maleic anhydride.

The incompatibility of polymers with one another is well established. And, coming up with a workable combination of polymers is still as much luck and art as it is science.

In the past, the terms "polymer alloy" and "polymer blend" or "polyblend" were used interchangeably. Technically, and as used herein, the term "polymer alloy" means a combination of polymers which are fully compatible with one another. By contrast, a "polymer blend" or "polyblend" is formed by physically combining resins that are less than fully compatible with one another. Typically, the claim of full compatibility of polymer alloys i.e. full miscibility, is shown by total thermodynamic miscibility as determined by glass transition temperature analysis.

According to this invention there is provided a polymer alloy comprising a first and a second polymer wherein the first polymer is a random copolymer of recurring units of methylmethacrylate and recurring units of N-phenylmaleimide and wherein the second polymer is a random copolyme or terpolymer of recurring units of styrene, recurring units of maleic anhydride and, optionally, recurring units of N-phenylmaleimide whereby the first and second polymers are fully compatible with one another.

In one embodiment, the polyxer alloy is an alloy of a methylmethacrylate/N-phenylmaleimide copolymer with a styrene/maleic anhydride copolymer.

In another embodiment, the polymer alloy is an alloy of a methylmethacrylate/N-phenylmaleimide copolymer with a styrene/maleic anhydride/N-phenylmaleimide terpolymer.

In another embodiment, the polymer alloy comprises a styrene/acrylonitrile copolymer.

In another embodiment, the polymer alloy comprises a styrene/acrylonitrile/N-phenylmaleimide terpolymer.

In yet another embodiment, at least one of the polymers is chemically grafted to a rubber.

The random methylmethacrylate/N-phenylmaleimioe copolymer suitable for use to produce polymer alloys of this invention will have a peak molecular weight within the range of from about 100,000 to about 500,000 preferably 250,000 to 350,000. The copolymer can be prepared by a free radical polymerization in solution, in bulk or by suspension. The copolymer will comprise from about 1 to about 50 weight percent N-phenylmaleimide and 99 to 50 weight percent methylmethacrylate. Preferably, the copolymer will be prepared by suspension polymerization and will comprise in weight percent, 1 to 40 N-phenylmaleimide and 99 to 60 methylmethacrylate. Copolymers of methylmethacrylate/N-phenylmaleimide chemically grafted to rubbers are also suitable for use. And, their use will serve to enhance the impact strength properties of the resulting polymer alloys. Methods for chemically grafting polymers to rubber are well known, see for example U.S. Pat. No. 3,489,822.

In order to maintain molecular weight, it is necessary to stabilize the methylmethacrylate/N-phenylmaleimide copolymer prior to any type of thermal processing, using any of the commercially available antioxidants. The preferred antioxidant is an equal weight percent mixture of N, N-diphenyl-p-phenylene diamine and tris(mono and dinonyl)phenyl phosphite. The total amount of antioxidant employed should be within the range of from about 1 to about 2 weight percent in addition to the total weight percent of the polymer alloy.

The random styrene/maleic anhydride copolymers or styrene/maleic anhydride/N-phenylmaleimide terpolymers suitable for use to produce the polymer alloys of this invention will comprise from about 9.5 to about 12.5 weight percent maleic anhydride (9.9 to 13.1 mole %) or from about 6 to about 9 weight percent maleic anhydride and from about to about 3 to about 8 weight percent N-phenylmaleimide. The copolymer or terpolymer should also possess a peak molecular weight within the range of 100,000 to about 300,000. The styrene/maleic anhydride copolymer or styrene/maleic anhydride/N-phenylmaleimide terpolymer suitable for use in this invention can be prepared by a free radical polymerization in solution or in bulk. Most prefered is a semicontinuous bulk polymerization process.

Styrene/maleic anhydride copolymers and styrene/maleic anhydride/N-phenylmaleimide terpolymers chemically grafted to rubbers are also suitable for use. Methods for preparing polymers chemically grafted to rubbers are well known. Rubber modified styrene/maleic anhydride copolymers are also available from ARCO Chemical Company, division of Atlantic Richfield Company, under the designation Dylark®styrenic copolymers.

The polymer alloys of this invention may also comprise a styrene/acrylonitrile copolymer or a styrene/acrylonitrile/N-phenylmaleimide terpolymer and still exhibit full miscibility. This is because the methylmethacrylate/N-phenylmaleimide copolymer serves as a compatibilizing (miscibilizing) agent between the styrene/maleic anhydride copolymer or N-phenylmaleimide-containing terpolymer, on one hand and the styrene/acrylonitrile copolymer, or styrene acrylonitrile/N-phenylmaleimide terpolymer, on the other hand. However, it is necessary, if the methylmethacrylate/N-phenylmaleimide copolymer is to function as a compatibilizing agent, that it be employed in an amount of at least 30 weight percent based on the polymer matrices to give a polymer alloy which exhibits total thermodynamic miscibility as determined by glass transition temperature analysis. If less than 30 weight percent is employed a polyblend, rather than an alloy, results.

The random styrene/acrylonitrile copolymers suitable for use in the polymer alloys of this invention are commercially available and will be selected to contain, in weight percent, within the range of from about 5 to about 35 recurring units of acrylonitrile, preferably from about 14 to about 30. The copolymer should also possess a peak molecular weight within the range of from about 100,000 to about 300,000.

Suitable styrene/acrylonitrile copolymers are commercially available from Monsanto Plastics & Resins Company, a unit of Monsanto Company under the designation Lustran®SAN Resins. Particularly suitable copolymers are designated Lustran®-31 and Lustran®-33.

Lustran®SAN 31 Resin contains 23.5 weight percent acrylonitrile and has a peak molecular weight of 128,000.

Lustran®SAN 33 Resin contains 33.2 weight percent acrylonitrile and has a peak molecular weight of 105,000.

The styrene/acrylonitrile/N-phenylmaleimide terpolymers suitable for use in this invention can also be prepared by a free radical polymerization in solution, in bulk or by suspension. The terpolymer will comprise in weight percent, within the range of from about 65 to 73 styrene, 20 to 34 acrylonitrile and 1 to 7 weight percent N-phenylmaleimide. The peak molecular weight of the terpolymer should be within the range of from about 100,000 to about 500,000.

Also suitable for use is a styrene/acrylonitrile copolymer or N-phenylmaleimide-containing terpolymer chemically grafted to a rubber.

A particularly suitable styrene/acrylonitrile copolymer grafted to a rubber is designated Royalene®PM 1000 Resin, commercially available from Uniroyal Chemical, Division of Uniroyal Inc.

Royalene®PM 1000 Resin is a styrene/acylonitrile copolymer grafted with an EPDM rubber (S/AN-g-EPDM) (50:50 weight percent) having a styrene matrix acrylonitrile content of about 26 weight percent.

Styrene/acrylonitrile/N-phenylmaleimide terpolymers grafted to rubbers are not known to be commercially available However, such materials can be prepared using known methods, for example, the method taught in Example I of U.S. Pat. No. 3,489,822.

The binary polymer alloys of this invention can be comprised of each of their polymeric components in amounts within the range of from about 1 to 99 weight percent based on the polymer matrices i.e. excluding the weight of any rubber.

If a styrene/acrylonitrile copolymer or terpolymer is also employed in the polymer alloy as a third component and full miscibility is to be obtained, the methylmethacrylate/N-phenylmaleimide copolymer which functions as the compatibilizing agent will be present in an amount of from about 30 to about 80 weight percent based on the polymer matrices, and each of the other components will be present in amounts within ranges of from about 60 to about 10 weight percent based on the polymer matrices. Employing less than about 30 weight percent based on the polymer matrices will result in a polyblend exhibiting less than total thermodynamic miscibility as determined by glass transition temperature analysis.

The polymer alloys of this invention may be prepared using any suitable method. Preferably, the alloys are prepared by melt mixing at a temperature above the softening points of the alloys using any conventional high shear melt mixing apparatus, including twin screw extruders single screw extruders and the like. The polymer alloy extrudate can be chopped into pellets and molded using any conventional molding including: injection molding, rotomolding, compression molding and the like. The word "molding" is meant to encompass all sheet and profile extrusion.

Having described the materials and methods of this invention reference is now made to the following examples which serve to demonstrate the invention.

EXAMPLE I

This example demonstrates the preparation of a methymethacrylate/N-phenylmaleimide copolymer suitable for use to prepare polymer alloys of this invention.

A citrate bottle was charged with 52.5g of methylmethacrylate, 17.5g of N-phenylmaleimide, 140g of distilled water, 10 milliliters of a 9.1% (wt.) tricalcium phosphate in water solution as the suspending agent, 0.003g of sodium bisulfite, 0.14g of t-butyl peroctoate and 0.06g of t-butyl perbenzoate. The citrate bottle was placed in a bottle polymerizer at 95° C. for 3 hours then 135° C. for 2 hours. The beads recovered contained 23.5 wt.% N-phenylmaleimide, exhibited a Tg (° C., DSC) of 143 and a peak molecular weight of 365,000.

EXAMPLE II

This example serves to demonstrate the preparation of the styrene/maleic anhydride copolymer suitable for use t prepare polymer alloys of this invention.

A resin kettle was charged with 1000 grams of styrene monomer and 2.0 grams of benzoyl peroxide. A solution containing 900 grams of styrene and 100 grams of maleic anhydride was added continuously over 3.0 hours at 87°–90° C. Once all of the styrene/maleic anhydride solution had been added the reaction was terminated with 1.0 gram of hydroquinone in 10 milliliters of tetrahydrofuran. The polymer syrup was diluted with 1000 grams of tetrahydrofuran and precipitated into methanol. This reaction scheme resulted in a 50 percent conversion of monomer with the maleic anhydride content of the final copolymer being about 10 weight percent. The copolymer was stabilized for melt processing and extruded; test specimens were injection molded.

Table I serves to shows the physical property values of the styrene/maleic anhydride copolymer.

TABLE I

| Property | Unit | ASTM | S/MA (Example 1) |
| --- | --- | --- | --- |
| Tensile Strength | psi | D-638 | 7,200 |
| Flexural Strength | psi | D-790 | 12,200 |
| Flexural Modulus | psi | D-790 | 465,000 |
| Tg | °C. | * | 124 |
| DTUL | ¼, °F. | D-648 | 208 |
| Notched Izod | ft-lbs/in | D-256 | 0.6 |
| Peak Mol. Weight | — | — | 170,000 |

*Glass transition temperature data was obtained by differential scanning calorimetry (DSC) and applied to the Flory-Fox relationship.

EXAMPLE III

This example serves to demonstrate the preparation of a styrene/maleic anhydride/N-phenylmaleimide terpolymer suitable for use in this invention.

A resin kettle was charged as in Example II. A solution containing 900 grams of styrene, 80 grams of maleic anhydride and 45 grams of N-phenylmaleimide was prepared and added in the exact manner described in Example II. The reaction was terminated at 50 percent conversion resulting a terpolymer with composition 88.4 percent by weight styrene, 7.5 percent by weight maleic anhydride and 4.1 percent by weight N-phenylmaleimide.

Table II serves to show the physical property values of the styrene/maleic anhydride/N-phenylmaleimide terpolymer.

TABLE II

| Property | Unit | ASTM | S/MA/NPMI (Example III) |
|---|---|---|---|
| Tensile Strength | psi | D-638 | 7,150 |
| Flexural Strength | psi | D-790 | 12,000 |
| Flexural Modulus | psi | D-790 | 430,000 |
| Tg | °C. | * | 125.5 |
| DTUL | ⅛, °F. | D-648 | 280.5 |
| Notched Izod | ft-lbs/in | D-256 | 0.6 |
| Peak Mol. Weight | — | — | 165,000 |

*Glass transition temperature data was obtained by DSC and applied to the Flory-Fox relationship.

EXAMPLE IV

This example demonstrates the preparation of a polymer alloy of this invention.

Five Hundred grams of methylmethacrylate/N-phenylmaleimide copolymer beads prepared in Example I were melt compounded at 520° F. with 500 grams of styrene/maleic anhydride copolymer pellets prepared in Example II.

The following Table III shows physical property values obtained for the resulting methylmethacrylate/N-phenyl maleimide-styrene/maleic anhydride polymer alloy as compared to the property values separately found for each copolymer component.

TABLE III

| Property | Unit | ASTM | MMA/NPMI (Example I) | S/MA (Example II) | MMA/NPMI-S/MA (Example IV) |
|---|---|---|---|---|---|
| Tensile Strength | psi | D-638 | 9,300 | 7,200 | 9,900 |
| Flexural Strength | psi | D-790 | 16,200 | 12,200 | 16,700 |
| Flexural Modulus | psi | D-790 | 560,000 | 465,000 | 570,000 |
| Tg | °C. | * | 143.0 | 124 | 135 |
| DTUL | ⅛, °F. | D-648 | 244 | 208 | 234 |
| Notched Izod | ft-lbs/in | D-256 | 0.6 | 0.6 | 0.8 |

*Glass transition temperature data was obtained by DSC and applied to the Flory-Fox relationship.

EXAMPLE V

This example demonstrates the preparation of another polymer alloy of this invention.

Five hundred grams of methylmethacrylate/N-phenylmaleimide copolymer beads prepared in Example I were melt compounded at 520° F. with 500 grams of styrene/maleic anhydride/N-phenylmaleimide terpolymer pellets prepared in Example III.

The following Table IV shows physical property values obtained for the resulting methyl methacrylate/N-phenylmaleimide-styrene/maleic anhydride/N-phenylmaleimide polymer alloy as compared to the property values separately found for each polymer component.

TABLE IV

| Property | Unit | ASTM | MMA/NPMI (Example I) | S/MA/NPMI (Example III) | MMA/NPMI-S/MA/NPMI (Example IV) |
|---|---|---|---|---|---|
| Tensile Strength | psi | D-638 | 9,300 | 7,150 | 10,100 |
| Flexural Strength | psi | D-790 | 16,200 | 12,000 | 16,500 |
| Flexural Modulus | psi | D-790 | 560,000 | 430,000 | 565,000 |
| Tg | °C. | * | 143 | 125.5 | 136 |
| DTUL | ⅛, °F. | D-648 | 244 | 208.5 | 235 |
| Notched Izod | ft-lbs/in | D-256 | 0.6 | 0.6 | 0.9 |

*Glass transition temperature data was obtained by DSC and applied to the Flory-Fox relationship.

EXAMPLE VI

This example serves to demonstrate that methylmethacrylate/N-phenylmaleimide copolymers function as ternary compatibilizing agents for styrene/maleic anhydride copolymers and styrene/acrylonitrile copolymers.

Table V shows the physical property values obtained for five polymer compositions (I–V). Each composition was prepared by melt compounding at 480° F.

Composition I is a blend of the styrene/maleic anhydride of Example II with Royalene PM 1000 Resin.

Composition II is a blend of this invention in which the methylmethacrylate/N-phenylmaleimide of Example I is employed as a ternary compatibilizing agent for the styrene maleic anhydride copolymer of Example II and Royalene PM 1000 Resin. A blehd rather than an alloy resulted because the anount of the methylmethacrylate/N-phenylmaleimide copolyme employed was 26.8 weight percent on the polymer matrix.

Compositions III, IV and V are polymer alloys of the invention, each containing different amounts of the methylmethacrylate/N-phenylmaleimide copolymer of Example I, the styrene/maleic anhydride of Example II and Royalene PM 1000 Resin. Each alloy contained more than 30 weight percent methylmethacrylate/N-phenylmaleimide copolymer based on the weight of the polymer matrix.

TABLE V

| Property | Unit | ASTM | Material | I | II | III | IV | V |
|---|---|---|---|---|---|---|---|---|
| | | | | \multicolumn{5}{c}{Total weight percent (weight percent based on the polymer matrix)} |
| | | | MMA/NPMI: | — | 22(26.8) | 42(51.2) | 25(30.4) | 42(48.8) |
| | | | S/MA: | 64(78.1) | 42(51.2) | 22(26.8) | 39(47.5) | 30(34.8) |
| | | | S/AN-g-EPDM[1]: | 36(21.9) | 36(21.9) | 36(21.9) | 36(21.9) | 28(16.2) |
| Tensile Strength | psi | D-638 | | — | 6,800 | 7,000 | 6,900 | 8,000 |
| Flexural Strength | psi | D-790 | | — | 9,600 | 10,700 | 9,700 | 126,000 |
| Flexural Modulus | psi | D-790 | | — | 310,000 | 330,000 | 310,000 | 375,000 |
| Tg | °C. | * | | 124,109 | 127,117 | 132 | 130 | 134 |
| DTUL | ¼, °F. | D-648 | | 206 | 210 | 221 | 212 | 228 |
| Notched Izod | ft-lbs/in | D-256 | | 1.1 | 1.8 | 5.6 | 4.6 | 3.4 |
| Gardner Falling Wt. Index | in-lbs. | — | | 30 | 48 | 184 | 144 | 136 |

[1]Royalene ® PM 1000 Resin.
*Glass transition temperature data was obtained by DSC and applied to the Flory-Fox relationship.

It will be evident from the foregoing that various modifications can be made to this invention. Such, however, are considered to be within the scope of this invention.

What is claimed is:

1. A polymer alloy comprising a first polymer, a graft second polymer, and a third polymer, wherein
    (a) the firt polymer is a random copolymer consisting essentially of recurring units of methylmethacrylate and recurring units of N-phenylmaleimide,
    (b) the graft second polymer is random polymer chemically grafted to a rubber wherein the random polymer is selected from the group consisting essentially of a random copolymer of recurring units of styrene and from about 9.5 to about 12.5 weight percent recurring units of maleic anhydride and a random terpolymer of recurring units of styrene, from about 6 to about 9 weight percent recurring units of maleic anhydride and from about 3 to about 8 weight percent recurring units of N-phenylmaleimide, and
    (c) the third polymer is selected from the group consisting essentially of a random copolymer of recurring units of styrene and recurring units of acrylonitrile and a random terpolymer of recurring units of styrene, recurring units of acrylonitrile and recurring units of N-phenylmaleimide;
wherein the first polymer is present in an amount of at least 30 weight percent based on the polymer matrices.

* * * * *